United States Patent
Heydt et al.

(10) Patent No.: US 6,876,510 B2
(45) Date of Patent: Apr. 5, 2005

(54) DETECTING HEAD LANDINGS ON A DATA ZONE OF A DATA STORAGE DISC

(75) Inventors: Jeffrey A. Heydt, Oklahoma City, OK (US); David R. Street, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 274 days.

(21) Appl. No.: 10/186,965

(22) Filed: Jun. 28, 2002

(65) Prior Publication Data

US 2003/0174429 A1 Sep. 18, 2003

Related U.S. Application Data

(60) Provisional application No. 60/365,283, filed on Mar. 18, 2002.

(51) Int. Cl.[7] ............................................... G11B 21/02
(52) U.S. Cl. ....................................................... 360/75
(58) Field of Search ................................ 360/75, 78.06

(56) References Cited

U.S. PATENT DOCUMENTS

| | | | |
|---|---|---|---|
| 5,495,156 A | 2/1996 | Wilson et al. | |
| 5,781,363 A | 7/1998 | Rowan et al. | |
| 5,844,743 A | 12/1998 | Funches | |
| 5,936,788 A | 8/1999 | Boutaghou et al. | |
| 5,963,393 A | 10/1999 | Rowan et al. | |
| 6,025,968 A | 2/2000 | Albrecht | |
| 6,081,400 A | 6/2000 | Lu et al. | |
| 6,204,629 B1 * | 3/2001 | Role et al. | 318/803 |
| 6,222,696 B1 | 4/2001 | Kim | |
| 6,252,744 B1 | 6/2001 | Kelemen | |
| 6,363,214 B1 | 3/2002 | Merello et al. | |
| 6,396,652 B1 | 5/2002 | Kawachi et al. | |
| 2002/0054451 A1 | 5/2002 | Moon et al. | |
| 2003/0112537 A1 * | 6/2003 | Forrer, Jr. | 360/31 |

* cited by examiner

Primary Examiner—Andrew L. Sniezek
Assistant Examiner—Mitchell Slavitt
(74) Attorney, Agent, or Firm—Fellers, Snider, et al.

(57) ABSTRACT

Method and apparatus for detecting head landings on a data zone of a data storage disc. A disc drive includes an actuator which controllably positions a head adjacent a disc and nominally retracts the head to a parked position when the drive is deactivated. The actuator moves in response to current applied to an actuator coil immersed in a magnetic field. During disc drive initialization, the disc is accelerated to a velocity sufficient to allow the head to be aerodynamically supported over the disc, and current is passed through the actuator coil to urge the head toward the parked position. The current is monitored to detect generation of a back electromotive force (bemf) voltage induced by movement of the coil. An error condition is logged indicating that an initial position of the head was over a data zone of the disc when bemf voltage is detected.

19 Claims, 4 Drawing Sheets

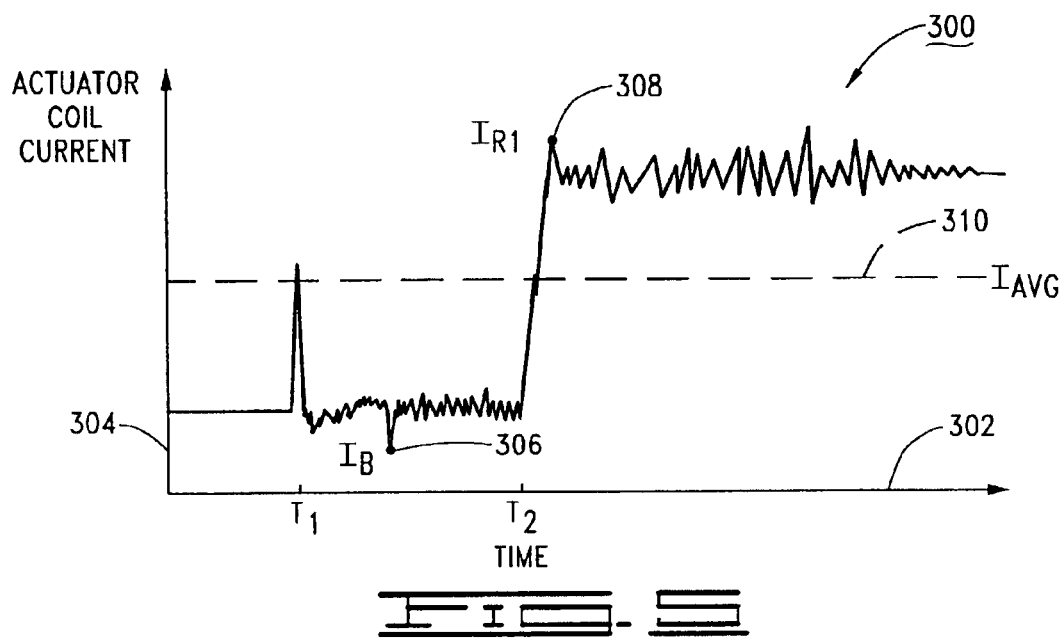

DETECTING HEAD LANDINGS ON A DATA ZONE OF A DATA STORAGE DISC

RELATED APPLICATIONS

This application claims the benefit of U.S. Provisional Application No. 60/365,283 filed Mar. 18, 2002.

FIELD OF THE INVENTION

The claimed invention relates generally to disc drive data storage devices and more particularly, but without limitation, to detecting the landing of a data transducing head onto a data zone of a recording disc in a disc drive.

BACKGROUND

Disc drives are digital data storage devices which store and retrieve large amounts of user data in a fast and efficient manner. The data are magnetically recorded on the surfaces of one or more rigid data storage discs. The discs are affixed to a spindle motor for rotation at a constant high speed. The discs and spindle motor are commonly referred to as a disc stack.

The disc stack is accessed by an array of vertically aligned data transducing heads which are controllably positioned by an actuator assembly. Each head typically includes electro-magnetic transducer read and write elements which are carried on an air bearing slider. The slider acts in a cooperative hydrodynamic relationship with a thin layer of air dragged along by the spinning discs to fly each head in a closely spaced relationship to the disc surface.

In order to maintain the proper flying relationship between the heads and the discs, the heads are attached to and supported by flexible suspension assemblies (flexures). An actuator motor (typically a voice coil motor, VCM) rotates the actuator assembly to cause the heads to move across the disc recording surfaces. The actuator assembly is also referred to as a head stack assembly (HSA). Both the disc stack and the HSA are mounted to and supported by a rigid base deck of the drive.

During normal operation of the disc drive, the heads are moved over data storage portions of the discs to write data to and read data from the discs as directed by the host device. When not in use, the heads are moved to a parked position such as on texturized landing zones near the inner diameter (ID) of the discs. A latch typically secures the actuator when the heads are in the parked position to prevent inadvertent movement of the heads out onto the data storage portions of the discs as a result of the application of a non-operational mechanical shock to the drive.

Direct contact between the heads and the data storage portions of the discs is usually undesired since damage can occur to the heads and/or discs if the heads come to rest against the data storage portions while the discs are in a nonrotating state. Moreover, if the stiction forces between the heads and discs are too great, the spindle motor may not be able to generate sufficient torque during a subsequent initialization operation to break the discs free, resulting in a catastrophic failure of the drive.

Accordingly, a typical disc drive is configured to retract the heads to the parked position when the disc drive enters a deactivated state, such as in response to a sleep command or in response to loss of power to the drive. The retraction of the heads typically takes place while the discs are decelerating to rest and thus the drive attempts to complete the movement of the heads to the parked position before the velocity of the discs drops to a level where the heads are no longer aerodynamically supported over the disc surfaces.

A variety of factors can cause the retraction operation to not be completed successfully, resulting in the landing of the heads onto the data storage portions of the discs. This often occurs during drive development, but can also happen during field use. If a head landing on a data storage portion of a disc does not result in catastrophic failure of the drive (due to the inability to subsequently spin-up the discs), the occurrence of data zone landings may go undetected, but nevertheless may degrade the reliability of the drive.

One way the occurrence of data zone landings can be indirectly detected is when sufficient amounts of data have been corrupted due to prior landings. This approach can take a long time to detect because there may be only a small degradation of the discs, because error correction code (ECC) techniques may mask the problem, or because the testing process for the disc drive may not return to the affected data zone for a long time.

Another way to detect data zone landings is to open the drive visually inspect for evidence of improper landing events. These indirect methods identify the occurrence of data zone landings much too late in the process.

There is therefore a need for improvements in the art directed to detecting when a disc drive head improperly lands in a data zone of a disc surface.

SUMMARY OF THE INVENTION

In accordance with preferred embodiments, a disc drive data storage device includes an actuator which controllably positions a data transducing head adjacent a data zone of a rotatable disc and nominally retracts the head to a parked position when the device is deactivated. The actuator moves in response to application of current to an actuator coil immersed in a magnetic field of a voice coil motor.

Preferably, the disc is accelerated to a velocity sufficient to cause the head to attain aerodynamic support over the disc. Current is next passed through the actuator coil to urge the head in a direction toward the parked position.

As the current is passed through the actuator coil, the current is monitored to detect generation of a back electro-motive force (bemf) voltage induced by motion of the coil with respect to the magnetic field. When such bemf voltage is detected, an error condition is logged indicating that the initial position of the head was over the data zone and not in the parked position.

Preferably, the current is passed through the coil by applying a substantially constant voltage across the actuator coil. In such case the generation of the bemf voltage is determined in relation to a reduction in the current passing through the actuator coil as the actuator coil moves with respect to the magnetic field.

The actuator coil is further preferably electrically shorted prior to the passage of the retraction current through the actuator coil, and a brake current sample value indicative of a magnitude of the brake current is preferably obtained.

A maximum retract current sample value indicative of a maximum magnitude of current passing through the actuator coil is further preferably obtained. The brake current sample value and the maximum retract current sample value are preferably combined to establish a threshold value that is used to detect the generation of the bemf voltage.

Detection of an improper landing event in this manner advantageously aids the disc drive development process, and also finds value during field use of a disc drive. The retraction parameters can be revised in response to the occurrence of an improper landing event, can provide early warnings of reliability degradation, and allow the drive to reallocate data from affected areas of the disc surface or to monitor such areas for future problems.

These and various other features and advantages which characterize the claimed invention will become apparent upon reading the following detailed description and upon reviewing the associated drawings.

BRIEF DESCRIPTION OF THE DRAWINGS

FIG. 5 is a graphical representation of actuator coil current characteristics during operation of the routine of FIG. 4 when the actuator is properly latched in the parked position at the beginning of the routine.

FIG. 6 is a graphical representation of actuator coil current characteristics during operation of the routine of FIG. 4 when the actuator is not properly latched in the parked position and the heads are over the data zones of the discs at the commencement of the routine.

DETAILED DESCRIPTION

Figure 1:
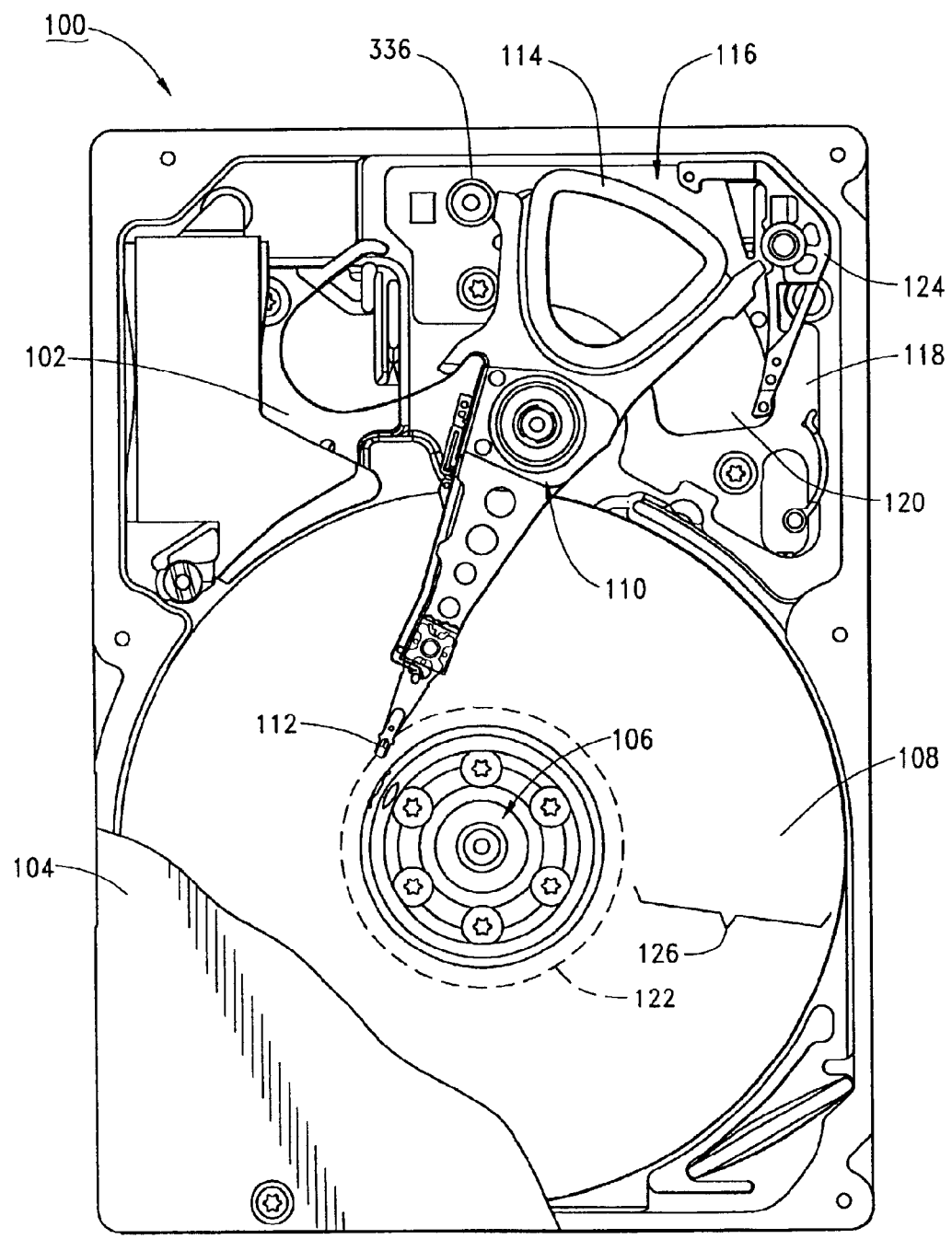
FIG. 1 is a plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100.

A spindle motor 106 rotates a number of magnetic recording discs 108 at a constant, high speed. An actuator 110 (also head stack assembly, HSA) supports a number of data transducing heads 112 adjacent the discs 108. The actuator 110 further supports a coil 114 of a voice coil motor (VCM) 116 opposite the heads 112.

The voice coil motor 116 includes a magnetic circuit comprising opposing pole pieces (the bottom of which is shown at 118) and one or more permanent magnets (one of which shown at 120) that generate a magnetic field in which the coil 114 is immersed.

The application of current to the coil 114 results in the generation of a coil magnetic field that interacts with the magnetic field of the magnetic circuit, and this interaction induces movement of the coil 114 with respect to the magnetic circuit. As the coil 114 moves, the actuator 110 pivots about an actuator axis and the heads 112 are moved across the disc surfaces.

When the disc drive 100 is deactivated, the actuator 110 is moved to a parked position and the heads 112 come to rest upon texturized landing zones (denoted by broken line 122) defined at the innermost diameters of the discs.

A magnetic latch 124 toggles to secure the actuator 110 in the parked position to prevent mechanical shocks from inadvertently allowing the heads 112 to move out onto data storage regions (data zones) 126 of the discs 108. Although not shown for clarity, the data zones 126 include a number of concentric data tracks to which user data are stored and from which user data are retrieved by the heads 112. It will be noted that FIG. 1 shows the actuator 110 in the parked position.

Figure 2:
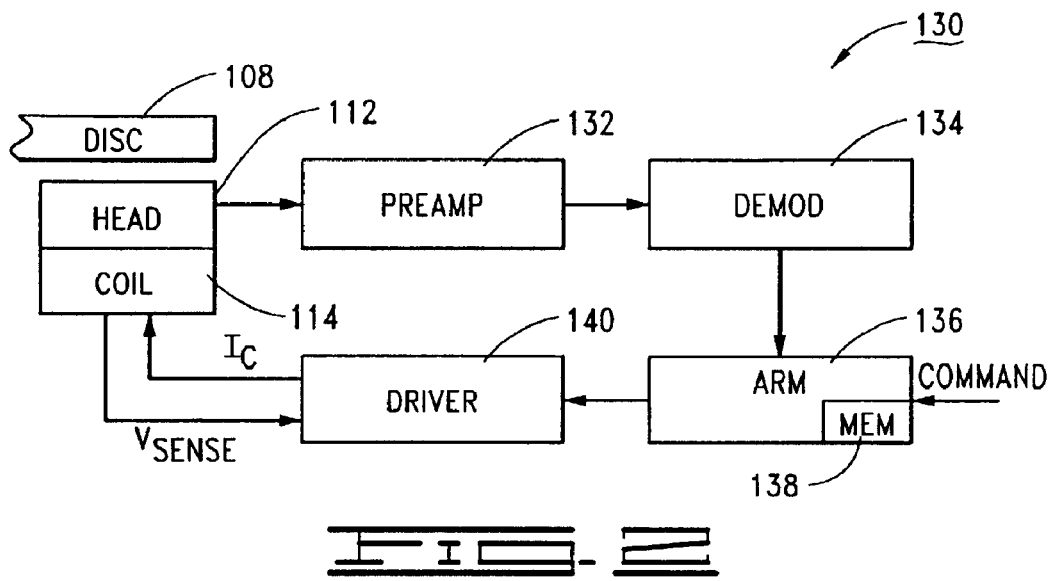
FIG. 2 is a functional block diagram of a servo system of a disc drive constructed in accordance with preferred embodiments of the present invention.

FIG. 2 shows a functional block diagram of a servo system 130 of the disc drive 100 used to control the position of the heads 112 with respect to the discs 108. Servo data from the tracks in the data zone 126 are transduced by the selected head 112 to provide readback signals that are preamplified by a preamplifier/driver circuit 132 and conditioned by demodulation (demod) circuitry 134.

A programmable ARM (advanced RISC (redundant instruction set computer) machine) device 136 responds to command inputs from a top level controller (not shown) and from programming stored in ARM memory (MEM) 138 to generate current command values indicative of a desired coil current to place the selected head 112 in a desired position with respect to the associated disc surface. The current command values are provided to a coil driver circuit 140, which in response thereto, applies a coil current $I_C$ to the coil 114.

Figure 3:
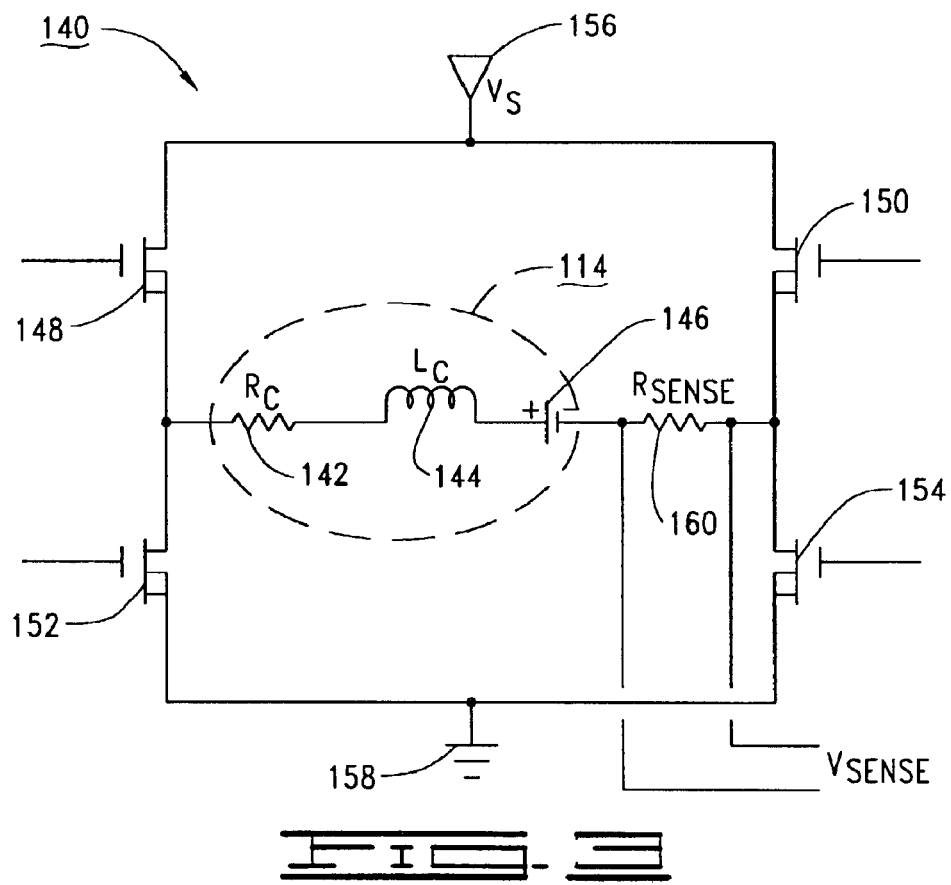
FIG. 3 is a schematic diagram of the coil and coil driver circuitry of the servo circuit of FIG. 2.

FIG. 3 provides a schematic diagram of relevant portions of the coil 114 and the driver circuit 140 of FIG. 2. The coil (shown generally by ellipse 114) is represented by a resistor 142, an inductor 144 and a back electromotive force (bemf) voltage source 146. The resistance $R_C$ represents the direct current resistance of the coil 114, the inductance $L_C$ represents the inductance of the coil 114 and the bemf voltage $V_{BEMF}$ represents the voltage generated in opposition to movement of the coil 114 with respect to the magnetic circuit of the VCM 116.

An array of field effect transistors (FETs) 148, 150, 152 and 154 form an H-bridge to selectively pass current through the coil 114 from a voltage source 156 to a ground terminal 158. As those skilled in the art will recognize, current is passed in a first direction through the coil 114 by activating FETs 148 and 154, and current is passed in a second direction through the coil by activating FETs 150 and 152.

The FETs are activated (made conductive from source to drain) by applying appropriate bias voltages to the respective gates of the FETs in relation to the magnitude of the current command values provided by the ARM device 136 (see FIG. 2)

A current sense resistor 160 with resistance $R_{SENSE}$ is placed in series with the coil 114 as shown. The magnitude of current passing through the coil 114 can be determined by monitoring a voltage $V_{SENSE}$ across the sense resistor 160. During normal operation, the ARM device 136 will command a current of selected magnitude and polarity, and in response the coil driver 140 will apply bias voltages to the appropriate pair of FETs 148, 154 or 150, 152 to establish the desired current flow through the coil 114.

Should the magnitude of current initiate sufficient velocity of the coil 114, the $V_{BEMF}$ voltage will oppose and hence lower the current flowing through the coil 114. Thus, to maintain the selected current magnitude, the $V_{SENSE}$ voltage will be used as an input to a linear amplifier (not shown) to increase the bias voltages applied to the gates of the selected pair of FETs 148, 154 or 150, 152. In this way, the coil driver 140 normally acts as a constant current source for the coil 114.

When the disc drive 100 is deactivated, ideally appropriate signals are provided to the coil driver 140 to ensure that the actuator 110 is moved to the parked position, the heads 112 come to rest upon the landing zones 122 and the latch 124 secures the actuator in place. However, as discussed above a number of factors may prevent the disc drive 100 from successfully parking the heads 112, resulting in the heads 112 coming to rest upon the data zones 126.

Figure 4:
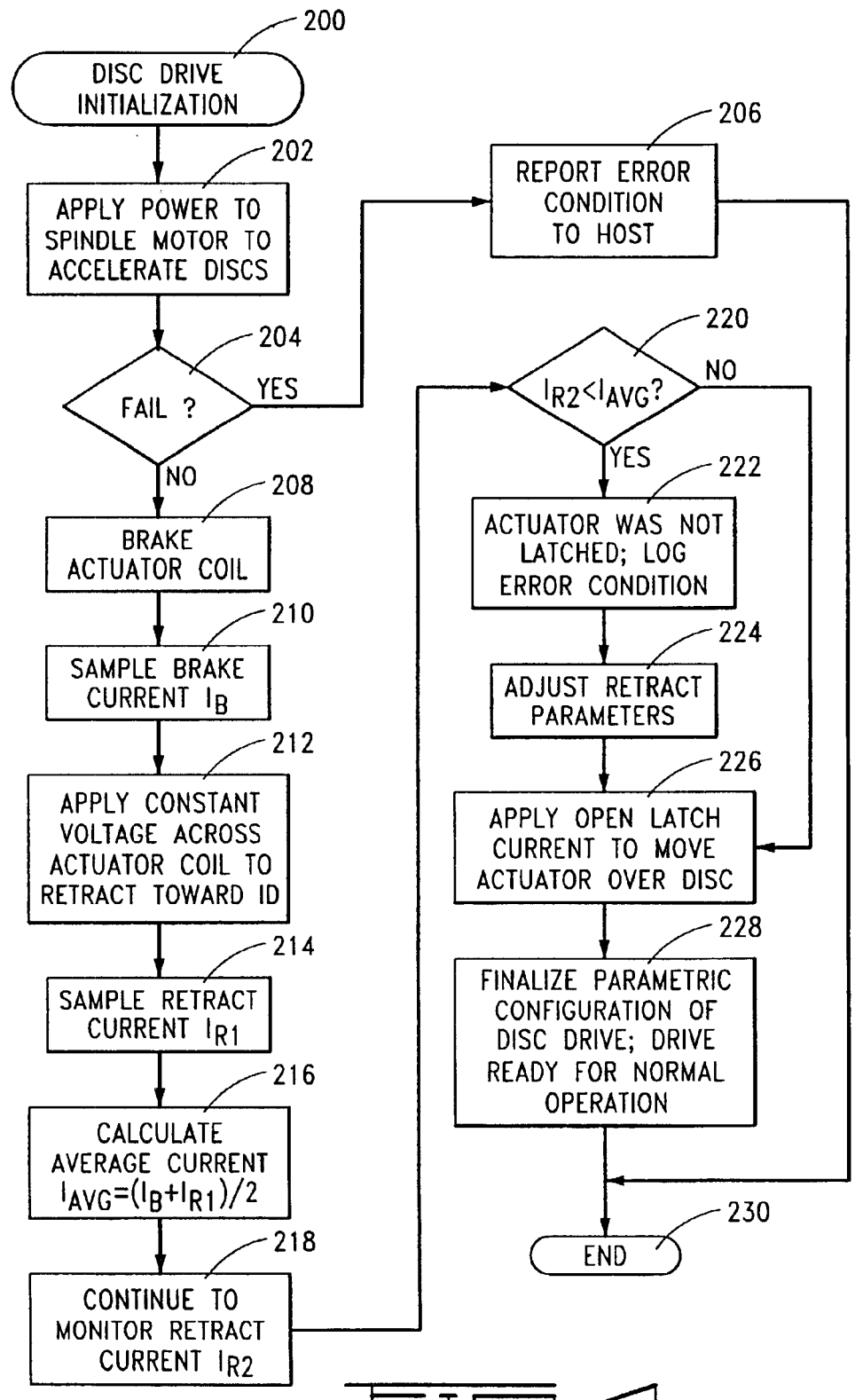
FIG. 4 is a flow chart for a DISC DRIVE INITIALIZATION routine.

Accordingly, FIG. 4 provides a flow chart for a DISC DRIVE INITIALIZATION routine 200, generally representative of steps carried out in accordance with preferred embodiments of the present invention to initialize the disc drive 100 after a previous deactivation operation. The routine 200 preferably represents programming stored in the ARM memory 138 and executed by the ARM device 136. The routine 200 places the disc drive 100 into an operationally ready state and at the same time detects whether a data zone landing occurred when the drive was previously deactivated.

Power is first applied to the spindle motor 106 at step 202 to accelerate (spin-up) the discs 108 to an operational velocity sufficient to aerodynamically support the heads 112 over the disc surfaces. Decision step 204 inquires whether the spin-up operation of step 202 failed.

While any number of factors can potentially prevent the spindle motor 106 from attaining operational velocity, one factor can be the fact that the heads 112 came to rest upon the data zones 126 and the spindle motor 106 cannot generate sufficient torque to overcome the head-disc stiction forces. Regardless of the cause, when the spin-up operation fails the routine passes to step 206 where an error condition is reported to the host device.

When the discs are successfully accelerated to the operational velocity, the flow continues to step 208 wherein the actuator coil 114 is temporarily electrically shorted to apply a braking force to the coil 114. Preferably, this occurs by activating the two lower FETs 152, 154 so that the coil 114 is shorted across the ground terminal 158. This substantially removes all energy from the coil 114.

A brake current $I_B$ (also referred to as a minimum current) is sampled at this time as shown by step 210. Preferably, the brake current is determined in relation to the sense voltage $V_{SENSE}$ (FIG. 3).

The routine continues to step 212 wherein a constant voltage is next applied across the coil 114 with an appropriate magnitude and polarity to retract the coil 114 to the parked position (i.e., toward the inner diameter (ID) of the discs 108 in this case). With reference again to FIG. 3, this is preferably carried out by applying selected bias voltages to the appropriate pair of the FETs 148, 154 or 150, 152 to establish the desired voltage across the coil 114.

In a preferred approach, the upper FET 148 or 150 is made fully conductive (from source to drain) and the lower FET 154 or 152 is made partially conductive (from source to drain) to establish the desired voltage drop across the coil 114. It will be noted that unlike normal operation discussed above, the voltage across the coil 114 is maintained irrespective of the magnitude of current that flows through the coil 114.

A maximum retract current $I_{R1}$ (also referred to as the maximum current) is next sampled at step 214, again preferably in relation to the sense voltage VSENSE. An average current $I_{AVG}$ is next determined at step 216 as the average between the retract current $I_R$ and the brake current $I_B$.

If the actuator 110 was successfully latched during the previous deactivation operation, then the actuator 110 will be properly positioned in the parked position as shown in FIG. 1. Thus, application of the constant voltage at step 212 will result in substantially no movement of the actuator coil 114 with respect to the magnetic circuit, and hence substantially no generation of bemf voltage $V_{BEMF}$.

On the other hand, if the actuator 110 did not successfully latch during the previous deactivation operation so that the heads 112 begin at a starting point over the data zones 126, the application of the constant voltage at step 212 will induce movement of the coil 114 with respect to the magnetic circuit, resulting in the generation of bemf voltage $V_{BEMF}$ as the actuator is moved to the parked position (thereby reducing the actuator coil current).

Accordingly, as shown by step 218 the drive continues to monitor the retract current during application of the constant voltage (these subsequent retract current sample values are collectively denoted as $I^{R2}$).

Decision step 220 determines whether the retract current falls below the average current determined at step 216; if so, the routine determines that the actuator 110 was not successfully latched and an error condition is logged at step 222. Conversely, if the retract current does not fall below the average current, the routine determines that the actuator 110 was properly latched.

When an error condition is detected, further corrective actions are taken by the disc drive 100 as desired such as an adjustment of the retract parameters used by the drive as shown by step 224. The drive 100 can further attempt to determine where the heads 112 came to rest on the data zones 126 and take further steps such as monitoring these areas for future failures, reallocating data from these areas, etc.

The logged error conditions can further be used by reliability monitoring routines of the disc drive 100, allowing a user to predict pending failure of the disc drive and allowing appropriate backup and replacement activities to take place before the user is adversely affected.

Regardless whether the actuator 110 was determined to be properly latched, it will be noted that at the end of the application of the constant voltage across the coil 114, the actuator 110 will be in the parked position.

The routine thus passes to step 226 wherein an appropriate open latch current is applied to move the actuator 110 against the latch 124 to toggle the latch open and permit movement of the heads 112 over the data zones 126. Finally, the disc drive performs additional parametric configuration operations at step 228 to place the drive in proper condition for normal operation, after which the routine ends at step 230.

FIG. 5 provides a graphical representation of a coil current curve 300 generally representative of current that passes through the actuator coil 114 during the routine of FIG. 4 when the actuator 110 is properly latched in the parked position. The curve 300 is plotted against an elapsed time x-axis 302 and an actuator coil current magnitude y-axis 304.

The coil is first shorted at time $T_1$ (step 208 of FIG. 4) and the minimum brake current $I_B$ is thereafter determined as indicated at point 306. It will be noted that the brake current sample can be determined in a number of ways, including taking a measurement at a discrete time or by opening a search window upon application of the braking operation and identifying the minimum braking current during the search window. The particular manner in which various samples are obtained are thus not limiting to the scope of the claimed invention.

The constant voltage of step 212 is next applied across the coil 114 at time $T_2$ and the maximum retract current $I_{R1}$ is determined as indicated at point 308. The average current $I_{AVG}$ of step 216 is calculated based on the $I_B$ and $I_{R1}$ samples, and is graphically indicated by broken threshold line 310.

Since the actuator 110 is latched in this example, substantially no movement of the coil 114 takes place. Thus, all of the remaining retract current samples (those falling after point 308) remain above the threshold line 310, indicating that the actuator 110 was successfully latched.

FIG. 6 provides a graphical representation of a second coil current curve 320 generally representative of current that passes through the actuator coil 114 during the routine of FIG. 4 when the actuator 110 is not properly latched in the parked position during the previous deactivation operation. The curve 320 is plotted against an elapsed time x-axis 322 and an actuator coil current magnitude y-axis 324.

The coil 144 is shorted at time $T_1$ and the minimum brake current $I_B$ is determined as indicated at point 326. The constant voltage is next applied across the coil 114 at time $T_2$ and the maximum retract current $I_{R1}$ is determined at point 328. The average current $I_{AVG}$ is calculated and shown by threshold line 330.

Since the actuator 110 is not latched in this example, movement of the coil 114 generates bemf voltage that opposes, and thus reduces, the current in the coil 114. A cross-over point 332 indicates that the actuator 110 was not properly latched. Eventually, at point 334 the actuator 110 comes into contact with an inner crash stop (336 in FIG. 1) and after some oscillation, comes to rest in the parked position.

While preferred embodiments presented herein apply constant voltage across the coil 114 and detect the presence of bemf voltage in relation to changes in the coil current, such is not necessarily limiting to the claimed invention. For example, bemf voltage in the coil 114 could alternatively be used to detect motion by commanding a constant current and detecting significant changes in the required bias voltages applied to the FETs 148, 150, 152 and 154.

Moreover, while preferred embodiments have used a parked position with texturized landing zones at the ID of the discs, such is not limiting as the claimed invention can readily be used for ramp loaded head configurations as well as configurations that park the heads at the outer diameter (OD) of the discs.

It will now be understood that, without limitation, the present invention as embodied herein and as claimed below is generally directed to determining whether a data transducing head landed in a data zone of a data storage disc during a previous deactivation operation.

In accordance with preferred embodiments, a disc drive data storage device (such as 100) includes an actuator (such as 110) which controllably positions a data transducing head (such as 112) adjacent a data zone (such as 126) of a rotatable disc (such as 108) and nominally retracts the head to a parked position (such as 122) when the device is deactivated, the actuator moving in response to application of current to an actuator coil (such as 114) immersed in a magnetic field.

The method preferably comprises steps of accelerating the disc surface to a velocity sufficient to cause the head to attain aerodynamic support over the disc surface (such as by step 202); passing current through the actuator coil to urge the head in a direction toward the parked position (such as by step 212); monitoring the current to detect generation of a back electromotive force (bemf) voltage (such as by step 218); and logging an error condition indicating that an initial position of the head during the accelerating step was over the data zone when the bemf voltage is detected during the monitoring step (such as by step 222).

Preferably, the passing step comprises applying a substantially constant voltage across the actuator coil, and the monitoring step preferably comprises detecting the generation of the bemf voltage in relation to a reduction in the current passing through the actuator coil as the actuator coil moves with respect to the magnetic field.

The method further preferably comprises electrically shorting the actuator coil to brake the actuator coil (such as by step 208) prior to the passing step, and obtaining a brake current sample value (such as $I_B$) indicative of a magnitude of current passing through the actuator coil (such as by step 210). The method further preferably comprises obtaining a maximum retract current sample value (such as $I_{R1}$) indicative of a maximum magnitude of current passing through the actuator coil (such as by step 214). The brake current sample value and the maximum retract current sample value are preferably used to detect the generation of the bemf voltage (such as by steps 216, 220).

The apparatus generally includes a servo circuit (such as 130) generally configured to carry out the aforementioned steps.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A method for determining whether a head has been moved to a parked position by steps comprising:
   completing a park routine;
   subsequently moving a disc at a sufficient velocity so that the head has aerodynamic support adjacent the disc;
   energizing an actuator coil to urge the head in a direction toward the parked position;
   monitoring an actuator coil current to detect generation of a beck electromotive force (bemf) voltage indicating the head was not in the parked position after completing the parked routine.

2. The method of claim 1, wherein the energizing step comprises applying a substantially constant voltage across the actuator coil, and wherein the monitoring step comprises detecting the generation of the bemf voltage in relation to a reduction in die current passing through the actuator coil as the actuator coil moves.

3. The method of claim 1, further comprising electrically shooting the actuator coil to brake the actuator coil prior to the energizing step.

4. The method of claim 3, further comprising obtaining a brake current sample value indicative of a magnitude of current passing through the actuator coil during the electrically shorting step, and wherein the brake current sample value is used during the monitoring step to detect the generation of the bemf voltage.

5. The method of claim 1, further comprising obtaining a maximum retract current sample value indicative of a maximum magnitude of current passing through the actuator coil during the energized step, and wherein the maximum retract current sample value is used during the monitoring step to detect the generation of the bemf voltage.

6. The method of claim 1, further comprising adjusting retract characteristics of the disc drive in response to detection of the bemf voltage.

7. The method of claim 1, wherein the monitoring step comprises establishing a threshold current magnitude level and detecting the generation of the bemf voltage when the current passing through the actuator coil crosses over the threshold current magnitude level.

8. The method of claim 1, further comprising:

electrically shorting the actuator coil to brake the actuator coil prior to the energizing step;

obtaining a brake current sample value indicative of a magnitude of current passing through the actuator coil during die electrically shorting step;

obtaining a maximum retract current sample value indicative of a maximum magnitude of current passing through the actuator coil during the energizing step; and calculating a threshold current magnitude level in relation to the brake current sample value and the maximum retract current sample value, wherein the threshold current magnitude level is used during the monitoring step to detect the generation of the bemf voltage.

9. The method of claim 8, wherein the threshold current magnitude level of the calculating step is determined as an average of the brake current sample value and the maximum retract current sample value.

10. A disc drive data storage device configured to perform the method of claim 1.

11. A servo circuit adapted for passing current through an actuatorcoil immersed in a magnetic field to move a data head across a data storage surface, wherein the servo circuit selectively moves the data head from a data zone to a parked position of the data storage surface, and wherein the servo circuit subsequently determines whether the data head failed to move to the parked position during a most recently performed move operation by moving the data storage surface to a velocity sufficient to cause the data head to attain aerodynamic support adjacent the data storage surface, passing current through the actuator coil to urge the data head in a direction toward the parked position while monitoring the current to detect generation of a back electromotive force (bemf) voltage indicating that the data head was over the data zone at the conclusion of the most recently performed move operation.

12. The servo circuit of claim 11 adapted for passing the current through the actuator coil by applying a substantially constant voltage across the actuator coil, and wherein the servo circuit further detects the generation of the bemf voltage in relation to a reduction in the current passing through the actuator coil as the actuator coil moves with respect to the magnetic field.

13. The servo circuit of claim 11 adapted for electrically shorting the actuator coil to brake the actuator coil prior to passing the current through the actuator coil.

14. The servo circuit of claim 11 adapted for obtaining a maximum retract current sample value indicative of a maximum magnitude of current passing through the actuator coil and using the maximum retract current sample value to detect the generation of the bemf voltage.

15. The servo circuit of claim 11 adapted for establishing a threshold current magnitude level and detecting the generation of the bemf voltage when the current passing through the actuator coil crosses over the threshold current magnitude level.

16. A data storage device, comprising:

an actuator which supports a data transducing head adjacent a data storage surface and which supports an actuator coil in a magnetic field, wherein passage of current through the actuator coil induces movement of the head across the data storage surface, and wherein the actuator selectively moves the head from a data zone to a parked position of the data storage surface; and first means for determining whether the actuator failed to move the head to the parked position during die most recently performed move operation.

17. The storage device of claim 16, wherein the first means comprises a servo circuit which passes current through the actuator coil to move the head across the data storage surface, wherein the servo circuit is configured to move the data storage surface to a velocity sufficient to cause the head to attain aerodynamic support adjacent the data storage surface, pass current through the actuator coil to urge the head in a direction toward the parked position while monitoring the current to detect generation of a back electromotive force (bemf) voltage indicating that the head was over the data zone at the conclusion of the most recently performed move operation.

18. The data storage device of claim 17, wherein the servo circuit passes the current though the actuator coil by applying a substantially constant voltage across the actuator coil, and wherein the servo circuit further detects the generation of the bemf voltage in relation to a reduction in the current passing through the actuator coil as the actuator coil moves with respect to the magnetic field.

19. A servo circuit that retracts a head to a parked position and subsequently determines whether the head failed to retract.

* * * * *

UNITED STATES PATENT AND TRADEMARK OFFICE
CERTIFICATE OF CORRECTION

PATENT NO. : 6,876,510 B2
DATED : April 5, 2005
INVENTOR(S) : Jeffrey A. Heydt et al.

It is certified that error appears in the above-identified patent and that said Letters Patent is hereby corrected as shown below:

Column 8,
Line 41, replace "beck" with -- back --.
Line 48, replace "die" with -- the --.
Line 62, replace "energized" with -- energizing --.

Column 9,
Line 11, replace "die" with -- the --.
Line 29, replace "actuatorcoil" with -- actuator coil --.

Column 10,
Line 25, replace "die" with -- the --.
Line 48, replace "retract." with -- retract by indicating the head was adjacent a data zone at the conclusion of a most recently performed move operation. --.

Signed and Sealed this

Twenty-third Day of August, 2005

JON W. DUDAS
*Director of the United States Patent and Trademark Office*